US010287181B2

(12) United States Patent
Martikainen et al.

(10) Patent No.: US 10,287,181 B2
(45) Date of Patent: May 14, 2019

(54) ELECTROCHEMICAL REACTOR FOR ELECTROCHEMICALLY TREATING WATER, A WATER TREATMENT APPARATUS AND USE OF SUCH SAID ELECTROCHEMICAL REACTOR

(71) Applicant: OUTOTEC (FINLAND) OY, Espoo (FI)

(72) Inventors: Mika Martikainen, Espoo (FI); Mikko Karhu, Espoo (FI); Matti Luukkonen, Helsinki (FI); Niko Isomäki, Helsinki (FI); Tuomas Van Der Meer, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/011,826

(22) Filed: Jun. 19, 2018

(65) Prior Publication Data
US 2018/0297860 A1    Oct. 18, 2018

Related U.S. Application Data

(63) Continuation of application No. PCT/FI2016/050904, filed on Dec. 21, 2016.

(30) Foreign Application Priority Data

Dec. 22, 2015    (FI) ................................ 20155993

(51) Int. Cl.
*C02F 1/00*    (2006.01)
*C02F 1/461*    (2006.01)
(Continued)

(52) U.S. Cl.
CPC .......... *C02F 1/006* (2013.01); *C02F 1/46104* (2013.01); *C02F 2103/10* (2013.01);
(Continued)

(58) Field of Classification Search
CPC ...................................................... C02F 1/463
See application file for complete search history.

(56) References Cited

U.S. PATENT DOCUMENTS 3,766,037 A    10/1973    Lee
4,028,174 A *   6/1977    Myren ................ D21F 1/48
                                                162/264
(Continued)

FOREIGN PATENT DOCUMENTS

DE    2555175 A1    8/1976
EP    0650930 A1    5/1995
(Continued)

OTHER PUBLICATIONS

International Search Report issued by the European Patent Office acting as the International Searching Authority in relation to International Application No. PCT/FI2016/050904 dated Feb. 22, 2017 (5 pages).
(Continued)

*Primary Examiner* — Salil Jain
(74) *Attorney, Agent, or Firm* — Robert P. Michal, Esq.; Carter, DeLuca & Farrell LLP

(57) ABSTRACT

An electrochemical reactor for electrochemically treating water, including a shell structure defining an inner space. The shell structure further includes an inlet portion having an inlet for conducting a water flow to the inner space, and a reactor chamber in flow connection with the inlet portion, and preferably with an outlet portion. The inlet is arranged such that the water flow to the inner space is directed away from the reactor chamber so as to cause the water flow to mix by forcing the water flow to change direction before entering the reactor chamber. A water treatment apparatus having such a reactor, and the use of such a reactor are also disclosed.

12 Claims, 4 Drawing Sheets

(51) Int. Cl.
| | |
|---|---|
| C02F 103/10 | (2006.01) |
| C02F 103/16 | (2006.01) |
| C02F 103/28 | (2006.01) |
| C02F 103/30 | (2006.01) |
| C02F 103/32 | (2006.01) |
| C02F 103/34 | (2006.01) |

(52) U.S. Cl.
CPC ...... *C02F 2103/16* (2013.01); *C02F 2103/28* (2013.01); *C02F 2103/30* (2013.01); *C02F 2103/32* (2013.01); *C02F 2103/346* (2013.01); *C02F 2201/4611* (2013.01); *C02F 2201/4615* (2013.01); *C02F 2201/46145* (2013.01); *C02F 2301/024* (2013.01)

(56) References Cited

U.S. PATENT DOCUMENTS

| | | |
|---|---|---|
| 4,732,661 A | 3/1988 | Wright |
| 2013/0233703 A1 | 9/2013 | Kaspar |

FOREIGN PATENT DOCUMENTS

| | | | | |
|---|---|---|---|---|
| EP | 1174394 A2 | 1/2002 | | |
| GB | 1501492 A | 2/1978 | | |
| KR | 2004-0006902 | * 1/2004 | ............. | C02F 1/463 |
| KR | 20040006902 A | 1/2004 | | |
| WO | WO-0073215 A2 | 12/2000 | | |
| WO | WO-2008009973 A1 | 1/2008 | | |
| WO | WO-2010051131 A1 | 5/2010 | | |
| WO | WO-2016005662 A1 | 1/2016 | | |

OTHER PUBLICATIONS

Written Opinion of the International Searching Authority issued by the European Patent Office acting as the International Searching Authority in relation to International Application No. PCT/FI2016/050904 dated Feb. 22, 2017 (7 pages).

International Preliminary Report on Patentability issued by the European Patent Office acting as the International Preliminary Examining Authority in relation to International Application No. PCT/FI2016/050904 dated Mar. 9, 2018 (8 pages).

Finnish Search Report issued by the Finnish Patent and Registration Office in relation to Finnish Application No. 20155993 dated Jun. 20, 2016 (2 pages).

* cited by examiner

ELECTROCHEMICAL REACTOR FOR ELECTROCHEMICALLY TREATING WATER, A WATER TREATMENT APPARATUS AND USE OF SUCH SAID ELECTROCHEMICAL REACTOR

CROSS-REFERENCE TO RELATED APPLICATIONS

This application is a continuation of PCT International Application No. PCT/FI2016/050904 filed Dec. 21, 2016, which claims priority to Finnish Patent Application No. 20155993, filed Dec. 22, 2015, the disclosure of each of these applications is expressly incorporated herein by reference in their entirety.

FIELD OF THE INVENTION

The present invention concerns an electrochemical reactor for electrochemically treating water. More particularly, the present invention relates to enhancing the water flow within the electrochemical reactor. The present invention additionally concerns a water treatment apparatus and the use of an electrochemical reactor in an apparatus or method for electrochemically treating water.

BACKGROUND INFORMATION

An electrochemical reactor is presented in, for example, publication US2013/0233703 A1, which discloses an electrocoagulation reactor arrangement. The reactor has inlets for conducting a water flow to the reactor, in which the water flow is passed by charged electrode plates that electrochemically treat the water. The water flow is subsequently directed to outlets for conducting the water flow out of the reactor.

SUMMARY

An object of the present invention is to provide an electrochemical reactor for electrochemically treating water, within which electrochemical reactor the water flow characteristics have been enhanced, thus contributing to several advantages. It is a further object to provide a water treatment apparatus and the use of an electrochemical reactor in an apparatus or method for electrochemically treating water.

The invention is based on the idea that the water flow is introduced in to the reactor in such a manner that the direction of the water subsequently diverges in order to flow towards the reactor chamber, and further, to the outlet. This is achieved by providing an inlet portion into which the water flow is introduced, thus enabling controlling the flow before it reaches the reactor chamber.

As discussed above, several advantages follow. Firstly, the water flow past the plurality of electrode plates in the reactor chamber is more evenly distributed over the electrode plates because the water can not flow directly from the inlet to the reactor chamber. As a result, electrode plates wear more evenly with respect to each other.

The diverging of the water flow generates vortices at the inlet portion, i.e. a turbulent flow that causes a homogenous distribution of particles within the flow. This, also, promotes even wear of the electrode plates, as the particles passing through the electrode plates are homogenously distributed within the flow passing the electrode plates. Additionally, solid depositions within the reactor are minimized, as the particles within the water flow are distributed homogenously and are thus less prone to accumulate on the surfaces of the reactor.

Generally, an electrode plate has to be replaced when it wears above a certain degree. Consequently, as the electrode plates wear more evenly with respect to each other, most or all of the electrode plates can be replaced simultaneously without the need to discard electrode plates that are still in operational condition due to uneven wear.

The even wear of the electrode plates is particularly advantageous when electrodes are provided as an electrode module because the whole module has to be replaced when any of the electrode plates therein wears above a certain degree. Thus, as electrode plates wear evenly, a longer operational life of an electrode module is achieved. Should multiple electrode modules be used, even wear enables that most or all of the electrode modules can be replaced simultaneously without the need to discard electrode modules that are still in operational condition due to uneven wear.

It is generally preferable to replace several electrode plates or electrode modules a time, as less down-time due to maintenance time is required.

BRIEF DESCRIPTION OF THE DRAWINGS

In the following the invention will be described in greater detail by means of preferred embodiments with reference to the accompanying drawings, in which.

DETAILED DESCRIPTION

Figure 1:
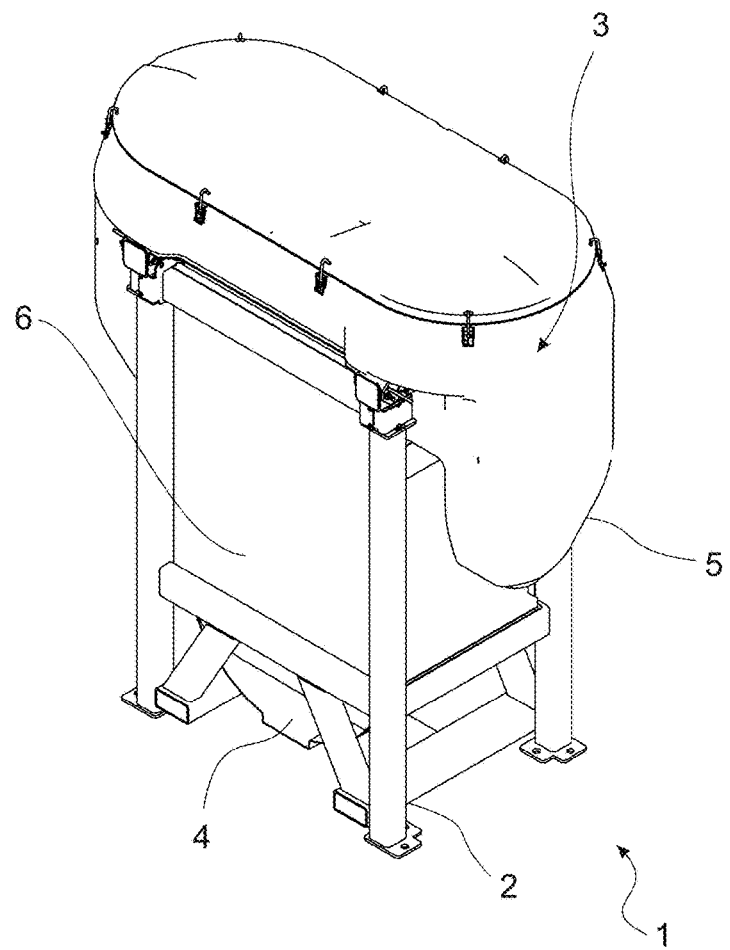
FIG. 1 illustrates a perspective view of an electrochemical reactor.

FIG. 1 illustrates a perspective view of an electrochemical reactor 1. The reactor comprises a shell structure 3, which is supported on a separate support structure 2. The shell structure forms an inlet portion 4, a reactor chamber 6 above the inlet 4 and outlet portions 5 extending laterally from the upper part of the reactor chamber 6.

Figure 2:
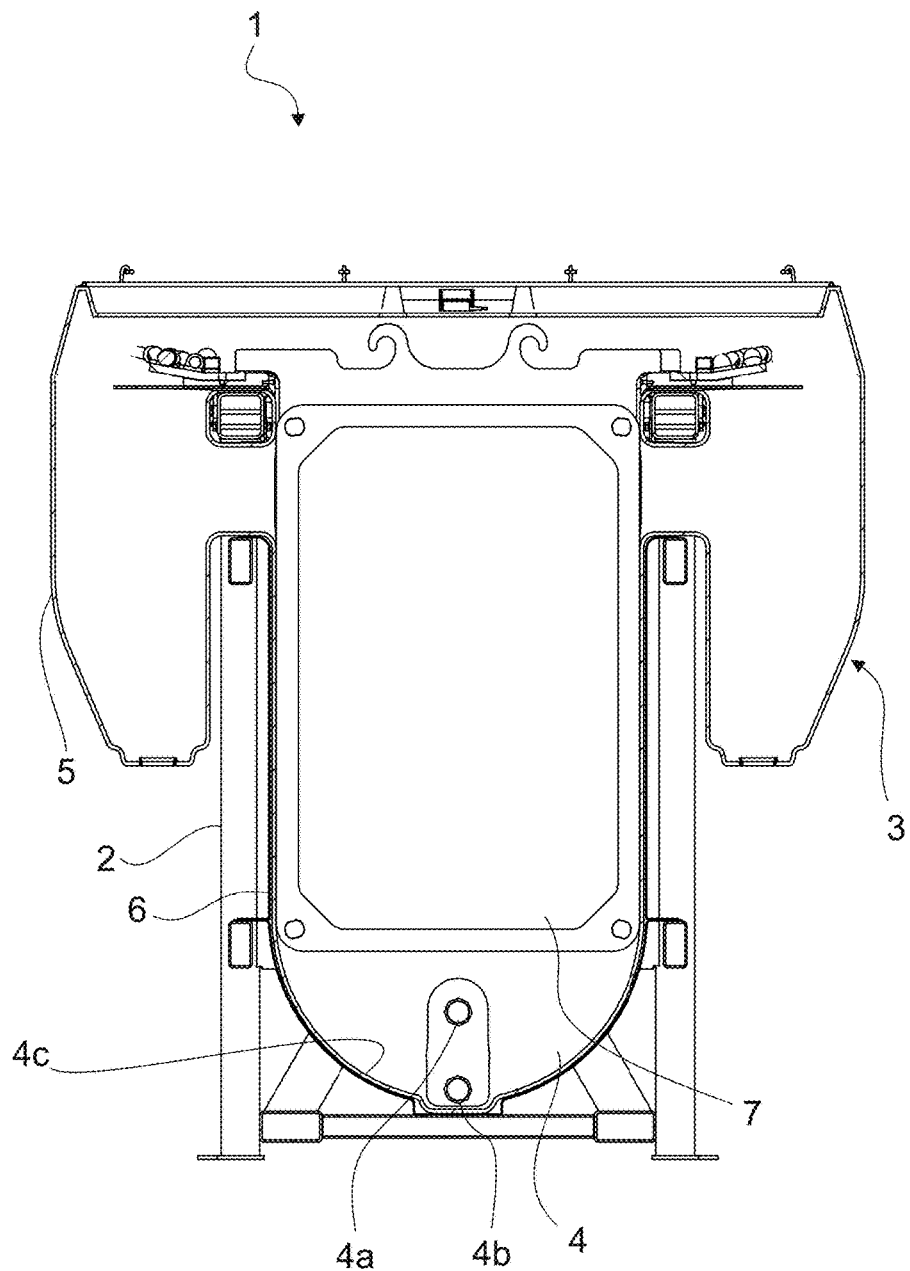
FIG. 2 illustrates a cross-sectional front view of an electrochemical reactor according to an aspect of the invention.

FIG. 2 illustrates a cross-sectional front view of the electrochemical reactor of FIG. 1. Particularly, the inner structure of the shell structure 3 can be more clearly seen. The inlet portion 4 is situated below a reactor chamber 6, in which electrode plates 7 are accommodated. From the top part of the reactor chamber 6, lateral conduits extend to the outlet portions 5 on both sides of the reactor chamber 6. From the level of the conduits connecting the outlet portion 5 and the reactor chamber 6, the outlet portions extend downwardly. Thus a flow path is provided from the inlet portion, to the reactor chamber, wherein the flow passes the electrode plate 7, and further, to the outlet portions.

The inlet portion 4 is equipped with an inlet 4a for leading a water flow to the inlet portion 4, and an drainage outlet 4b for enabling the electrochemical reactor 1 to be drained, for example during maintenance. The inlet portion 4 also comprises a deflection surface 4c formed by a curved inner surface on the bottom part of the inlet portion 4.

Figure 3:
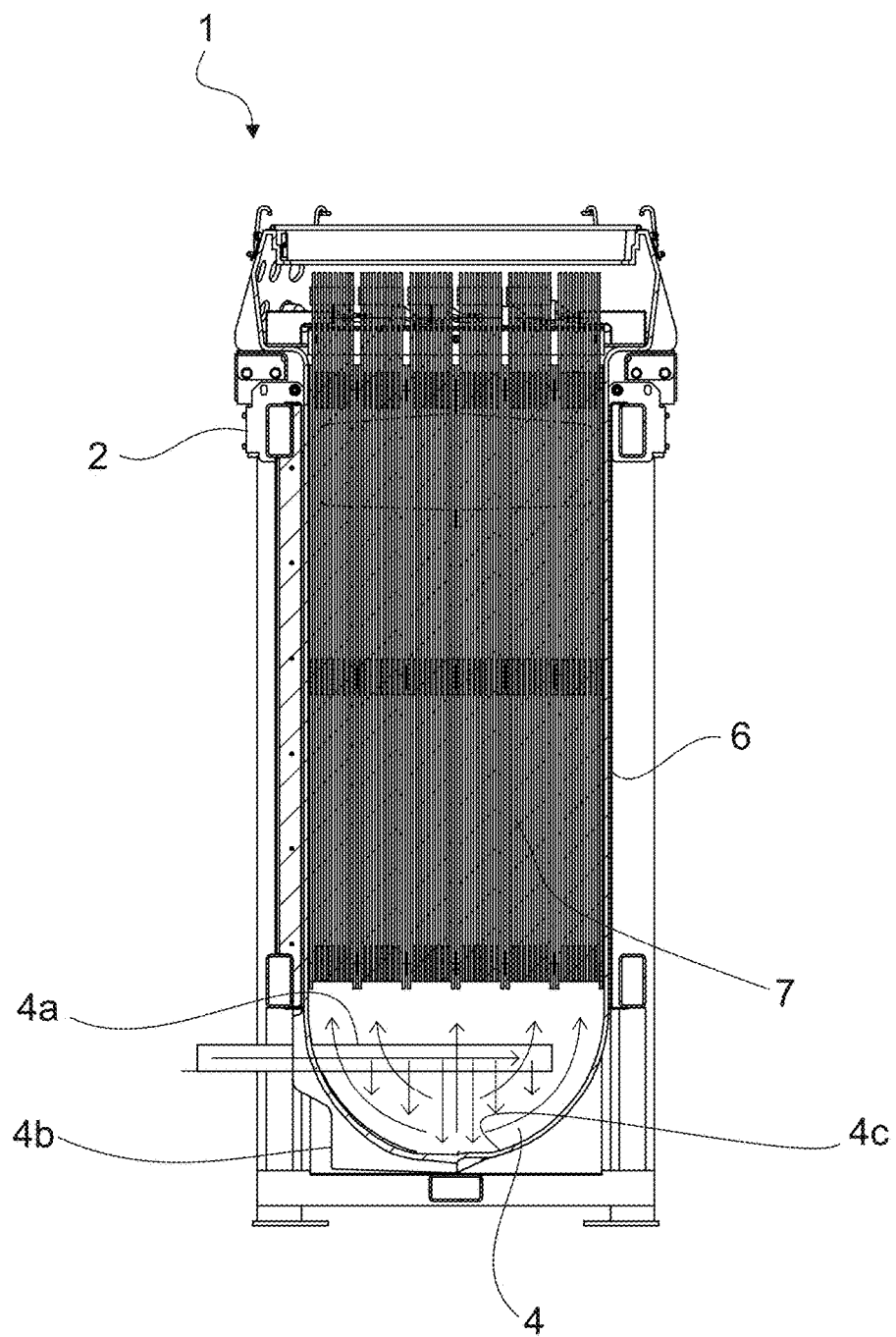
FIG. 3 illustrates a cross-sectional cross sectional side view representing a general example of directing the water flow within the inlet portion.

FIG. 3 illustrates a cross-sectional side view of the electrochemical reactor of FIG. 1. Particularly, it can be seen, that the electrode plates 7 are arranged as a plurality of electrode modules within the reactor chamber. Moreover, the flow arrangement within the inlet portion 4 is schematically illustrated by arrows. A water flow is led to the inlet 4a, from which it is directed away from the electrode plates 7 in the reactor chamber, namely towards the deflection surface 4c. The deflection surface 4c deflects, i.e. diverges the water flow directed towards it, so that the water flow is spread out and mixed in the inlet portion 4, and further, directed towards the electro plates 7 in the reactor chamber 6.

According to a first aspect of the invention, an electrochemical reactor 1 for electrochemically treating water is provided. The electrochemical reactor comprises a shell structure 3 defining an inner space. The shell structure 3 may, preferably, but not necessarily, be supported by a separate support structure 2.

The shell structure further comprises an inlet portion 4 having an inlet 4a for conducting a water flow to the inner space, and a reactor chamber 6 in flow connection with the inlet portion 4. Preferably, but not necessarily, the shells structure 3 also comprises an outlet portion 5 in flow connection with the reactor chamber 6 for conducting the water flow out of the electrochemical reactor 1.

The reactor chamber is further arranged for receiving a plate portion of at least one electrode plate 7 so as to direct the water flow past the at least one electrode plate, particularly, the water flow coming from the inlet portion 4.

The inlet 4a is arranged such that the water flow to the inner space is directed away from the reactor chamber 6 so as to cause the water flow to mix by forcing the water flow to change direction before entering the reactor chamber 6. As the direction of the water flow is diverged, vortices are generated within the water flow. This causes the water flow to spread out in the inlet portion 4, resulting in an even distribution of the flow at the reactor chamber 6. Consequently, the particles carried by the water flow are also mixed, thus resulting in an even distribution of particles within the water flow.

According to a second aspect of the present invention, the inlet portion 4 comprises a deflection surface 4c. Accordingly, the inlet 4a is arranged such that the water flow to the inner space is directed towards the deflection surface 4c in order to cause the water flow to diverge as it encounters the deflection surface. Preferably, the deflection surface 4c is arranged opposite to the flow connection between the inlet portion 4 and the reactor chamber 6. This forces the water flow to diverge to a direction opposite to the direction in which it is introduced from the inlet 4a, resulting in an efficient mixing of the particles in the water flow.

According to a third aspect of the present invention, the deflection surface 4c is a non-planar surface.

According to a fourth aspect of the present invention, the deflection surface 4c is a curved surface. Using a curved surface enhances the generation of vortices in the water flow. Preferably, but not necessarily, the curved surface is concave towards the inlet 4a, the reactor chamber 6, or both. Providing such a concave surface enables the water flow to run along the entirety of the surface, thus preventing the formation of blind spots, where local flow speed of the water flow is very slow, causing solid depositions.

According to a fifth aspect, the deflection surface 4c, as discussed in connection with any of the aspects above, may suitably be provided as inner surface the shell structure 3. More suitably, the deflection surface 4c may be provided as inner surface the shell structure 3 at the inlet portion 4. Most suitably, the deflection surface 4c may be provided as inner surface the shell structure 3, when in use, at the bottom of the inlet portion 4.

According to a sixth aspect of the present invention, the inlet 4a is arranged to provide, with a desired retention time, a turbulent flow within the inlet 4a. For example, the electrochemical reactor 1 may be designed to operate with a desired retention time, such that the fluid volume within the electrochemical reactor 1 is replaced during a given time interval. As a purely illustrative example, an electrochemical reactor having a liquid volume of 100 liters may be desired to be operated at a retention time of 0.5 hours, such that the fluid is replaced twice each hour, resulting in flow rate of 200 liter/hour. Consequently, the inlet 4a may be arranged such that, with a desired retention time, a turbulent flow is generated within the inlet 4a. Particularly, the cross-sectional effective flow area, e.g. an inner diameter of a tube, or the inner surface roughness may be arranged so as to provide a turbulent flow with the desired retention time. An alternative way to create a turbulent flow within the inlet 4a is to provide a feed nozzle structure, to the inlet 4a. For example, one or more orifices or other flow obstacles may be provided within the inlet 4a.

According to a seventh aspect of the present invention, the inlet 4a is arranged to provide a turbulent flow within the inlet 4a with a flow rate of preferably 1-40 $m^3/h$, more preferably 5-20 $m^3/h$, most preferably 10-15 $m^3/h$. Particularly, the cross-sectional effective flow area, e.g. an inner diameter of a tube, or the inner surface roughness may be arranged so as to provide a turbulent flow with the desired operation flow rate. An alternative way to create a turbulent flow within the inlet 4a is to provide a feed nozzle structure, to the inlet 4a. For example, one or more orifices or other flow obstacles may be provided within the inlet 4a.

According to an eighth aspect of the present invention, the inlet 4a is positioned at a distance between 50-500 mm from the deflection surface 4c. More preferably, the inlet 4a is positioned at a distance between 75-350 mm from the deflection surface 4c. Most preferably, the inlet 4a is positioned at a distance between 100-200 mm from the deflection surface 4c. It has been found, that a particularly suitable distance between the inlet 4a and the deflection surface 4c is approximately 140-150 mm. Among other factors, the distance between the inlet 4a and the deflection surface 4c defines the amount and intensity of vertices generated, i.e. how turbulent the flow is at the inlet portion 4a. Generally, it is desirable to provide a partially turbulent flow within the inlet portion 4, such that the particles carried by the water flow are mixed and evenly distributed, and such that water flow eventually calms, resulting in a laminar flow being achieved at the reactor chamber 6.

According to a ninth aspect of the present invention, the inlet 4a is positioned at a distance between 50-500 mm from the at least one electrode plate 7. More preferably, the inlet 4a is positioned at a distance between 75-350 mm from the at least one electrode plate 7. Most preferably, the inlet 4a is positioned at a distance between 100-200 mm from the at least one electrode plate 7. It has been found, that a particularly suitable distance between the inlet 4a and the at least one electrode plate 7 is approximately 140-150 mm. Among other factors, the distance between the inlet 4a and the at least one electrode plate 7 defines the amount and intensity of vertices generated, i.e. how turbulent the flow is at the inlet portion 4a. Generally, it is desirable to provide a partially turbulent flow within the inlet portion 4, such that the particles carried by the water flow are mixed and evenly distributed, and such that water flow eventually calms, resulting in a laminar flow being achieved at the reactor chamber 6.

Figure 4:
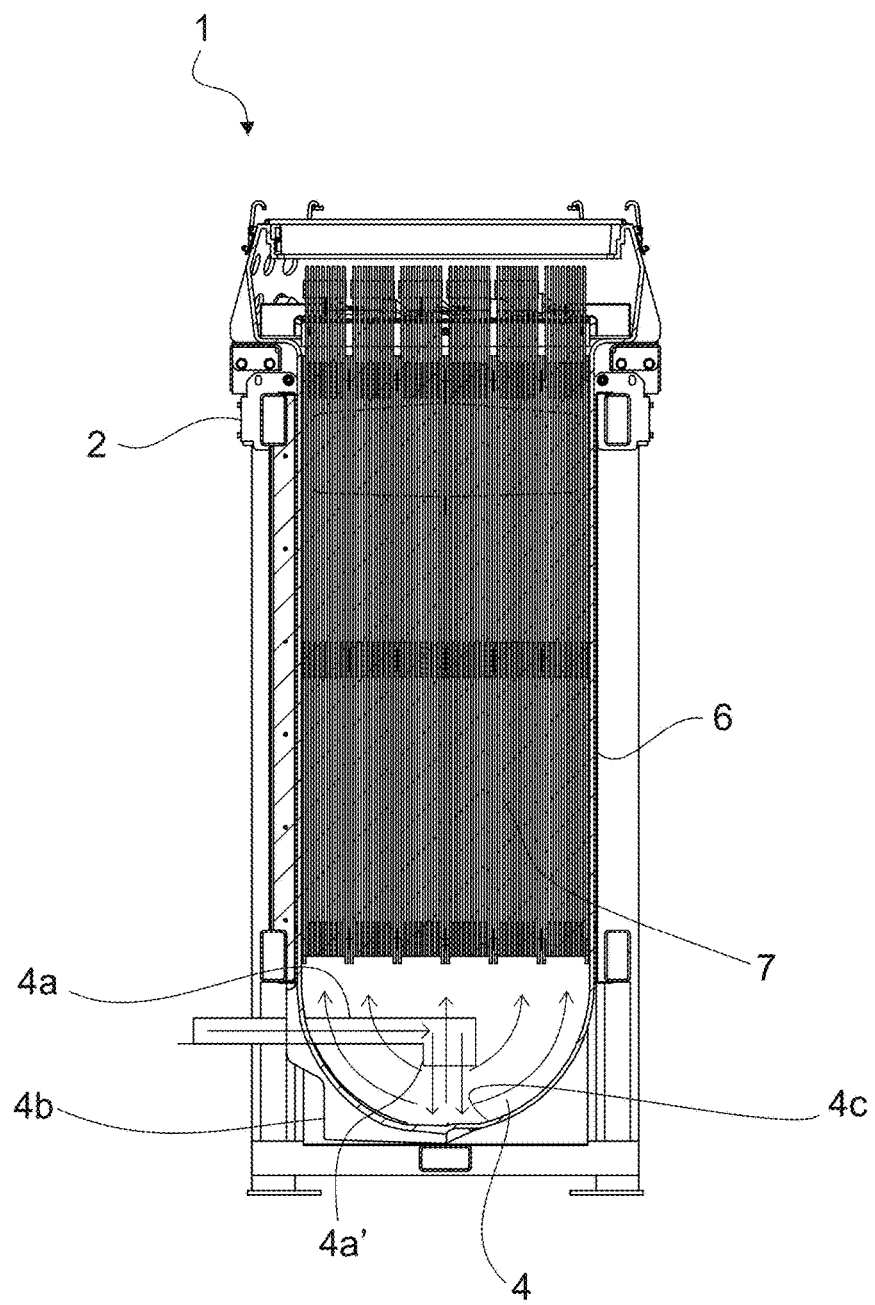
FIG. 4 illustrates a cross-sectional side view representing a general example of directing the water flow within the inlet portion, illustrating an inlet having a bent portion.

According to a tenth aspect of the present invention, water flow is directed away from the reactor chamber 6 by equipping the inlet 4a with a bent portion 4a' (FIG. 4) facing away from the reactor chamber 6. Preferably the inlet 4a is provided with a bent portion 4a' of 90 degrees arranged to face away from the reactor chamber 6, suitably towards the deflection surface 4c. The bent portion 4a' may be provided by, for example, an angled fitting such as an elbow fitting. The bent portion 4a' of the inlet 4a may be provided with a cross-sectional flow area increasing towards the distal end of the inlet 4a, i.e. a diffusor structure, for facilitating the expansion of the water flow within the inlet portion 4.

According to an eleventh aspect of the present invention, water flow is directed away from the reactor chamber 6 by providing the inlet 4a with one or more openings facing away from the reactor chamber. Preferably, the inlet 4a is provided as tubular section having a closed distal end, extending substantially horizontally within the inlet portion 4 while being equipped with one or more openings facing away from the reactor chamber 6, suitably towards the deflection surface 4c.

According to a twelfth aspect of the present invention, a water treatment apparatus having an electrochemical reactor 1 according to any of the aspects discussed above is provided.

According to a thirteenth aspect of the present invention, the use of an electrochemical reactor 1 according to any of the aspects discussed above in an apparatus or in a method for treating water is provided. The electrochemical reactor 1 is particularly suitable to be used for treating at least one of inorganic waste water such as mining and metals waste waters, electronics waste waters, chemical waste waters, car industry waste waters, and organic waste water such as food & beverage waste waters, textile and clothing waste waters, pulp and paper waste waters, domestic waste waters and agricultural waste waters.

The electrochemical reactor 1 can, for example, be used for treating water originating from pulp and paper, chemical industry, electronic and car industry, and textile and clothing industry.

The electrochemical reactor 1 can, for example, be used for domestic waste water treatment, municipal waste water treatment, and/or municipal drinking water treatment.

It should be noted, that the aspects discussed above may be combined in order to achieve desired results without deviating from the scope of the invention.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An electrochemical reactor for electrochemically treating water, comprising a shell structure defining an inner space, the shell structure further comprising:
    an inlet portion comprising an inlet for conducting a water flow to the inner space;
    a reactor chamber in flow connection with the inlet portion, and with an outlet portion, the reactor chamber being arranged for receiving plate portion of at least one electrode plate so as to direct the water flow past the at least one electrode plate,
    wherein electrode plates are arranged as a plurality of electrode modules within the reactor chamber,
    wherein the inlet is arranged such that the water flow to the inner space is directed away from the reactor chamber so as to cause the water flow to mix by forcing the water flow to change direction before entering the reactor chamber, and wherein the inlet portion comprises a deflection surface, opposite to the flow connection between the inlet portion and the reactor chamber, the inlet being arranged such that the water flow to the inner space is directed towards the deflection surface, away from the electrode plates in the reactor chamber,
    wherein the deflection surface is a curved surface, concave towards the inlet, and is provided as an inner surface of the shell structure,
    wherein the inlet is positioned so as to have a distance of between 50-500 mm, from the deflection surface, and so as to have a distance of between 50-500 mm from the electrode plates, and
    wherein the inlet is equipped with a bent portion facing away from the reactor chamber for directing the water flow away from the reactor chamber, one or more openings facing away from the reactor chamber, or both, for directing the water flow away from the reactor chamber.

2. The electrochemical reactor according to claim 1, wherein the inlet is arranged to provide a turbulent flow within the inlet with a desired retention time.

3. The electrochemical reactor according to claim 1, wherein the inlet is arranged to provide a turbulent flow within the inlet with a flow rate of 1-40 m$^3$/h.

4. The electrochemical reactor according to claim 1, wherein the inlet is positioned so as to have a distance of between 75-350 mm from the deflection surface.

5. The electrochemical reactor according to claim 1, wherein the inlet is positioned so as to have a distance of between 75-350 mm from the electrode plates.

6. A water treatment apparatus, wherein the apparatus comprises an electrochemical reactor according to claim 1.

7. A method for treating inorganic waste water, comprising:
    providing the electrochemical reactor of claim 1; and
    treating waste water with the electrochemical reactor, wherein the waste water is inorganic waste water.

8. A method for treating organic waste water, comprising:
    providing the electrochemical reactor of claim 1; and
    treating waste water with the electrochemical reactor, wherein the waste water is organic waste water.

9. The electrochemical reactor according to claim 1, wherein the inlet is arranged to provide a turbulent flow within the inlet with a flow rate of 5-20 m$^3$/h.

10. The electrochemical reactor according to claim 1, wherein the inlet is arranged to provide a turbulent flow within the inlet with a flow rate of 10-15 m$^3$/h.

11. The electrochemical reactor according to claim 1, wherein the inlet is positioned so as to have a distance of between 100-200 mm from the deflection surface.

12. The electrochemical reactor according to claim 1, wherein the inlet is positioned so as to have a distance of between 100-200 mm from the electrode plates.

* * * * *